N. BACIGALUPI.
SPRINKLING APPARATUS.
APPLICATION FILED MAY 25, 1909.

951,519.

Patented Mar. 8, 1910.

WITNESSES
Joe. P. Wehler.
E. M. Ricketts.

INVENTOR
Natalin Bacigalupi
By Watson E. Coleman Attorney

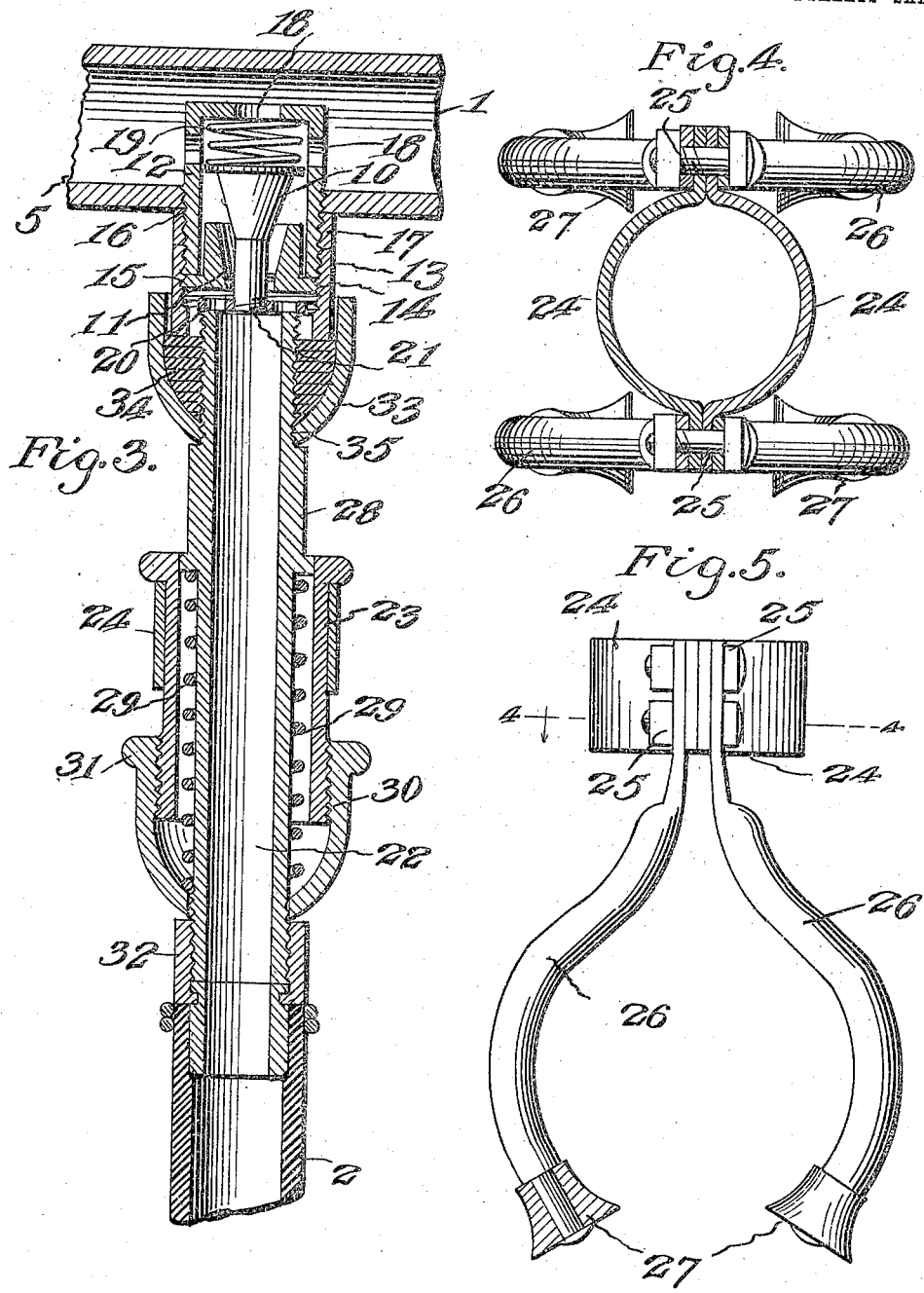

UNITED STATES PATENT OFFICE.

NATALIN BACIGALUPI, OF FAIR HAVEN, NEW JERSEY.

SPRINKLING APPARATUS.

951,519.   Specification of Letters Patent.   Patented Mar. 8, 1910.

Application filed May 25, 1909. Serial No. 498,324.

*To all whom it may concern:*

Be it known that I, NATALIN BACIGALUPI, a subject of the King of Italy, residing at Fair Haven, in the county of Monmouth and State of New Jersey, have invented certain new and useful Improvements in Sprinkling Apparatus, of which the following is a specification, reference being had to the accompanying drawings.

This invention relates to improvements in sprinkling apparatus more especially designed for use in greenhouses but which may be used at other places for analogous purposes.

The principal object of the invention is to provide a simple and practical sprinkling apparatus which will dispense with the necessity of dragging long lines of hose about greenhouses or other places where it is necessary to sprinkle or wash an extensive area.

Further objects of the invention are to provide an apparatus of this character in which the hose or pipe which carries the sprinkling or washing nozzle may be shifted along a supply pipe and connected to any one of a plurality of connections provided for it; to provide an apparatus of this character in which the supply pipe will act as a track for the carriage which supports the discharge hose or pipe; to provide an apparatus of this character having automatically opening and closing valves, whereby the connection of the discharge hose or pipe with the supply pipe may be instantly made without manually operating the valves or manipulating screw couplings or similar connections; and to provide an apparatus of this character which will have its various parts adjustable and detachable to permit wear to be taken up and to permit parts to be replaced when worn out.

With the above and other objects in view, as will hereinafter appear, the invention consists in the novel combinations and arrangements of parts and in the features of construction hereinafter fully described and claimed, and illustrated in the accompanying drawings, in which—

Figure 1:
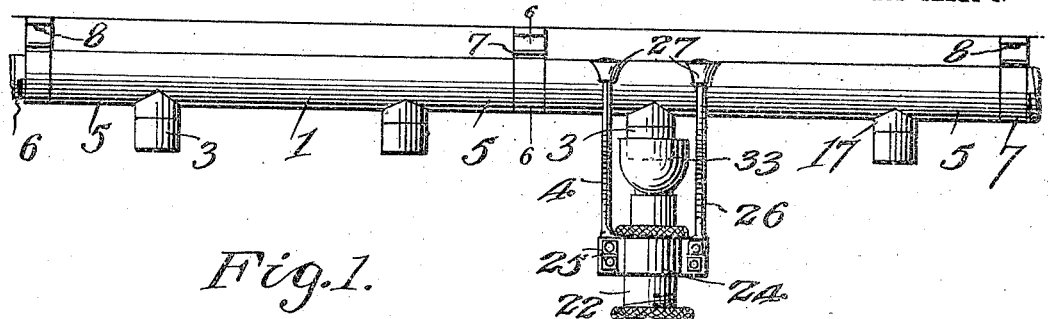
Figure 2:
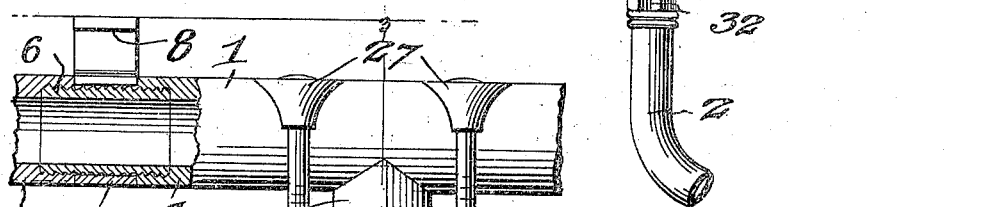
Figure 6:
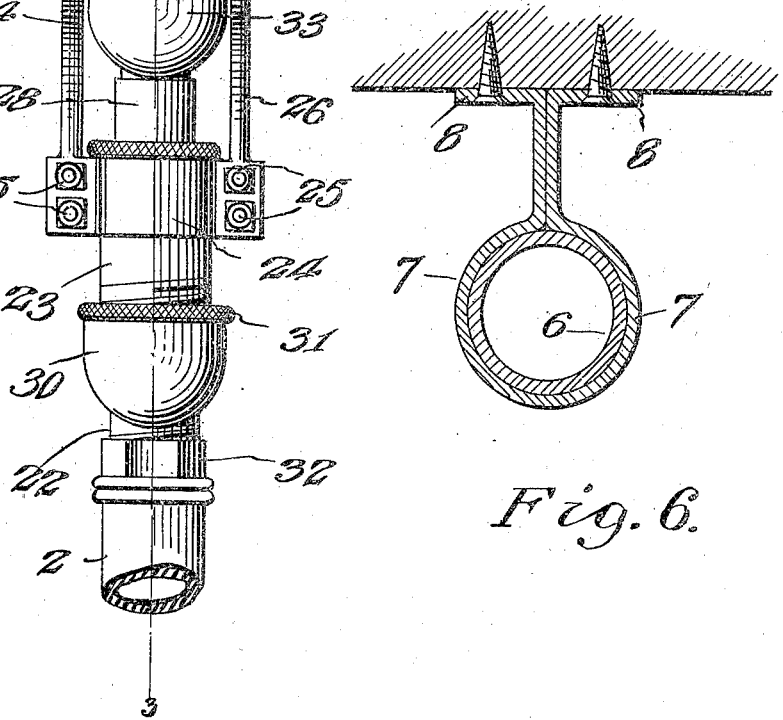

Figure 1 is a side elevation on a reduced scale of the preferred embodiment of my invention; Fig. 2 is a detail side elevation on a larger scale with parts broken away and in section; Fig. 3 is a vertical section taken on the plane indicated by the line 3—3 in Fig. 2; Figs. 4 and 5 are views of the carriage; and Fig. 6 is a detail view of one of the hangers for the supply pipe.

In the drawings 1 denotes a supply pipe for water or other liquid and 2 denotes a discharge or outlet pipe preferably, but not necessarily, in the form of a flexible tube or hose and which, if desired, may have a sprinkling head, or the like at its free end. The hose 2 is adapted to be moved longitudinally of the pipe 1 and applied to any one of a series of connections 3 arranged in said pipe. The pipe 1 extends from end to end or around the greenhouse, building, field or other place where the apparatus is to be used for sprinkling, irrigating, washing or analogous purposes and it is preferably adapted to serve as a track for a carriage 4 which carries that end of the hose which is applied to the connections 3. While said pipe 1 may be of any form and construction, it is preferably composed of short sections 5 each one of which contains one or more of the connections 3 and the ends of which are connected to the opposing ends of adjacent sections by coupling tubes 6 having their ends screwed into said sections 5, as clearly shown in Fig. 2 of the drawings.

The pipe 1 is mounted upon any suitable support by means of brackets or hangers 7, each of which is in the form of a metal strap bent around one of the coupling tubes or pipes 6 so as to lie within the plane of the outer surface of the sections 5 and not form any obstruction for the carriage 4, and the ends of which are brought together and bent to provide apertured attaching feet 8. The hose connection 3 contains a self closing valve 10 which is adapted to be automatically opened by the application of the hose or pipe 2 to the hose connection 3. As illustrated, said valve 10 has a cone-shaped body to engage a ground seat 11 which is adjustably arranged in a valve casing consisting of inner and outer tubular sections 12, 13. The valve seat 11 is made adjustable by providing it with a threaded flange 14 to engage internal screw threads 15 in the section 13, which threads 15 also engage screw threads 16 formed on the exterior of the section 12. The section 12 has its threads 16 engaged with the threaded opening in the pipe 1 and a spacing collar or washer 17 is arranged upon the outer end of the section 12 between the pipe 1 and the section 13. The section 12 has its inner end closed but formed with inlet openings 18 and in said inner end is a coil spring 19 which engages the reduced inner end of the valve 10 and actuates the latter to its closed position or upon the seat 11. The outer or free end of the casing section 13 forms a guide for an apertured or open head 20 fixed to the stem 21 of the valve, as clearly shown in Fig. 3 of the drawings.

The inner end of the hose 2 has connected to it a rigid tubular member or pipe section 22 slidably arranged in a guide 23 on the carriage 4 and adapted to enter the casing section 13 and engage and actuate the open head or plate 20 to move the valve 10 to its open position. Said guide 23 is tubular and is arranged in a clamp which consists of two semi-circular plates or straps 24 having their opposing ends united by bolts or similar fastenings 25. The latter also secure to the ends of the plates 24 pairs of oppositely curved arms 26 which extend partially around the pipe 1 and have journaled on their spaced converging extremities antifriction rollers 27 preferably of conical form.

The tubular valve releasing member or pipe 22 has a cylindrical enlargement 28 which slides in a guide 23 which forms a shoulder for one end of a coil spring 29 arranged on the reduced portion of said member 22 and having its other end engaged with an adjusting cap nut 30 screwed on the threaded end of the guide 23. The member or pipe 22 projects through and slides in the central opening in the cap nut 30, which latter may have a milled annular rib or flange 31 and removably mounted on the projecting extremity of said member or pipe 22 is a screw coupling 32 of ordinary construction by means of which the flexible portion of the hose or pipe 2 is connected to the rigid member 22. On the inner end of the member 22 is a cylindrical cup 33 adapted to receive the valve casing section 13 and to contain one or more packing rings or washers 34 which are pressed tightly against the end of the section 13 to provide a tight joint at this point. The packing cup 33 is preferably screwed on the threaded portion 35 of the member 22 so that it may be adjusted and removed.

In operation, it will be seen on reference to Fig. 3 that when the member 22 is inserted in the section 13 of the valve casing it will press the valve upwardly against the tension of the spring 19 so that water, liquid, gas or other fluid in the pipe 1 may pass through the connection 13 and into the hose or pipe 2. When it is desired to move the hose to a different point on the pipe 1, it is only necessary to pull the hose sufficiently to slide the section 22 outwardly in its guide 23 and against the tension of the spring 29 until its threaded inner end releases the valve and clears the section 13 of the valve casing, whereupon the hose may be pulled laterally to move it out of alinement with the connection 3 and it may be then moved to the next connection 3 or to a distant one by pulling on the hose to draw the carriage 4 longitudinally of the pipe 1. When the connections 3 are to be passed by the carriage it is necessary to retract the member 22 and it is also necessary to do this when the hose is applied to one of said connections 3. It will be noted that the valve 10 will be self-closing when the member 22 releases it so that there will be no waste of the water or other fluid in the pipe 1. This automatic connection and disconnection of the hose with the pipe 1 dispenses with the necessity of manually opening and closing valves and manipulating screw couplings and similar devices.

From the foregoing description it is thought that the operation of the invention will be readily understood without a more detailed explanation. It will be noted, however, that the apparatus is especially useful and convenient for gardeners in greenhouses and the like, but it may be used for analogous purposes such, for instance, as distributing a liquid or gaseous fluid from a supply pipe to different points located along such pipe, for irrigating purposes in the cultivation of crops, for washing or sprinkling train sheds, etc.

While I have shown and described in detail the preferred embodiment of the invention, it will be understood that I do not wish to be limited to the construction set forth since various changes in the form, proportion and arrangement of parts and in the details of construction may be resorted to within the spirit and scope of the invention.

Having thus described the invention what is claimed is:

1. In a sprinkling apparatus, the combination of a supply pipe provided at intervals with outlet openings, outlet pipes projecting radially from the supply pipe at said openings, spring seated valves in said outlet pipes, a carriage to travel along said supply pipe, a discharge pipe, a coupling member having one end connected to said discharge pipe and its intermediate portion slidably mounted in said carriage, its other end being adapted to enter one of said outlet pipes to engage the valve therein, a spring in said carriage for actuating the coupling member longitudinally to project it into one of said outlet pipes to open the valve therein, and a packing cup arranged on said coupling member and adapted to receive the outlet pipe into which said member is projected to provide a fluid-tight connection.

2. In a sprinkling apparatus, the combination of a supply pipe provided at intervals with outlet openings, hangers for said pipe, outlet pipes projecting radially from the supply pipe at its openings, spring seated valves in said outlet pipes, a carriage consisting of a tubular guide, opposing clamp plates engaged with said guide, pairs of oppositely curved arms secured to said clamp plates and adapted to receive the supply pipe between them and to move longitudinally along the latter, anti-friction rollers on said arms, a discharge pipe, a tubular coupling pipe connected to one end of the discharge pipe and slidably mounted in said tubular guide of the carriage, said coupling pipe adapted to have its other end project into one of said outlet pipes to engage the valve therein, a spring in the tubular guide of the carriage to actuate the coupling pipe longitudinally, and a packing cup upon the coupling pipe to receive one of said outlet pipes and to provide a fluid-tight connection between such outlet pipe and the coupling pipe.

In testimony whereof I hereunto affix my signature in the presence of two witnesses.

NATALIN BACIGALUPI.

Witnesses:
ALSTON BEEKMAN,
JAMES CANTWELL.